United States Patent
Alff et al.

(10) Patent No.: US 7,018,000 B2
(45) Date of Patent: Mar. 28, 2006

(54) MOTOR VEHICLE WHEEL DISC, IN PARTICULAR FOR A PASSENGER VEHICLE

(75) Inventors: Denis Alff, Riom (FR); Wolfgang Kruchten, Wuppertal (DE)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 10/855,751

(22) Filed: May 28, 2004

(65) Prior Publication Data

US 2005/0006945 A1  Jan. 13, 2005

Related U.S. Application Data

(63) Continuation of application No. PCT/EP02/13576, filed on Dec. 2, 2002.

(30) Foreign Application Priority Data

Dec. 3, 2001 (FR) .................................. 01 15742

(51) Int. Cl.
*B60B 3/04* (2006.01)

(52) U.S. Cl. .......................... 301/63.107; 301/35.621; 301/64.101

(58) Field of Classification Search ........... 301/63.101, 301/63.103, 64.101, 64.107, 63.107, 35.54, 301/35.621, 64.102; 29/894.34, 894.344; D12/211

See application file for complete search history.

(56) References Cited

U.S. PATENT DOCUMENTS

| 2,047,137 | A | * | 7/1936 | Eksergian | 301/35.59 |
| 2,116,598 | A | * | 5/1938 | Eksergian | 301/35.59 |
| 2,317,311 | A | * | 4/1943 | Stough | 301/35.626 |
| 2,407,749 | A | * | 9/1946 | Sinclair | 301/35.626 |
| 2,453,512 | A | * | 11/1948 | Jacobi | 301/35.626 |
| 3,366,421 | A | * | 1/1968 | Bradley | 301/35.622 |
| 3,989,307 | A | * | 11/1976 | Reppert | 301/64.101 |
| 6,042,194 | A | | 3/2000 | Fitz et al. | |
| 6,231,129 | B1 | | 5/2001 | Stach | |

FOREIGN PATENT DOCUMENTS

DE  26 39 483  3/1978
DE  201 08 995  10/2001

* cited by examiner

*Primary Examiner*—Russell D. Stormer
(74) *Attorney, Agent, or Firm*—Buchanan Ingersoll PC

(57) ABSTRACT

Wheel disc, including a radially outer circular mounting part, a radially inner fixing and centering part with a bearing region comprising a specified number of fixing apertures and ending radially inwardly with a centering aperture, and spokes connecting the inner and outer parts. Each spoke is disposed substantially circumferentially between two adjacent fixing apertures and the radially inner free edges of the radially outer circular part defining perforations with the free lateral edges of the spokes. In order to mechanically reinforce each spoke, the central region of each spoke is deformed in order to house a swelling receding axially outwardly relative to the lateral regions of the spokes, including a yoke opening into the centering aperture.

14 Claims, 4 Drawing Sheets

MOTOR VEHICLE WHEEL DISC, IN PARTICULAR FOR A PASSENGER VEHICLE

This application is a continuation of International PCT/EP02/13576 filed on Dec. 2, 2002 and which claims priority under 35 U.S.C. § 119 to French Patent Application Serial No. 01/15742 filed in France on Dec. 3, 2001.

BACKGROUND OF THE INVENTION

The invention relates to a motor vehicle wheel disc with arms, in particular for a passenger car, formed in one piece from embossed sheet metal, which represents an excellent compromise in terms of weight, cost, style or freedom of possible added styling (decorative wheel cover for example).

In the designing of a sheet metal wheel for a motor vehicle, the general aim is to optimise the weight and cost of such a product. The development of embossing techniques, numeric simulation means, and materials has led to great progress over the last few years. However, the majority of products has remained within the concept of a substantially axisymmetric disc (i.e. one whose cross-sectional profile is virtually fixed in form), comprising perforations and sometimes embossing in the upper part.

This type of profile does not give the product a very enhanced style or image, which explains in most cases why manufacturers resort to a decorative wheel cover placed on the product when it is mounted on the vehicle.

One can count several attempts to create style directly from the sheet metal forming the wheel disc by forming deep embossed areas forming stiffeners and/or a particular assembly of the disc with the rim (under-seat, "full-face" assembly, i.e. disc whose radially outer edge includes the outer flange and seat of the rim), with the rim welded at the end, etc. and sometimes associated with effects connected to painting. These attempts have not yet led to generalisation for reasons of excessive weight or difficulties in execution.

In general, the market for styled wheels for passenger cares is confined to the use of aluminium alloys. The process of manufacture (moulding, forging etc.) of these discs allows very broad freedom of style at reasonable weights, but has the disadvantage of being 4 to 8 (even 10) times more expensive.

The specification DE 201 08 995 U discloses a wheel whose disc is formed from a single piece of embossed sheet metal, with an inner face and an outer face. This disc has a radially outer circular mounting part intended to be connected to a rim, a radially inner part for fixing and centering to a wheel hub with a bearing area having a given number of fixing apertures and ending radially inwardly with an edge which is turned axially outwardly or centering apertures, and spokes or radial arms connecting the inner and outer parts, each spoke being disposed substantially circumferentially between two adjacent fixing apertures and the radially inner free edges of the radially outer circular part defining perforations with the free lateral edges of the spokes. This disc has a substantially circular, plane bearing region and each spoke comprises two lateral stiffening elements which extend radially from the bearing area to the radially outer circular assembly part and are disposed on either side of an intermediate strip axially receding towards the exterior of the disc.

Although freedom of styling either bare or with an attached part (decorative wheel cover for example) is apparently obtained, such a disc has the disadvantage of requiring a relatively thick sheet metal to be able to withstand the forces to which it is subjected during operation, in particular in the joining region between the spokes and the radially inner part for fixing and centering the disc.

Hereinafter:
the "internal face" of the disc shall refer to the side of the disc oriented inwards, in particular the internal face of the bearing region is intended to come into contact with the outer surface of the wheel hub to which the disc is to be fixed;

the "external face" of the disc, to the side of the disc oriented outwards, which side is visible when the wheel is mounted on the vehicle.

The object of the invention is a similar wheel disc in which, in order to reinforce each spoke mechanically, the central region of each of the arms or spokes is deformed in order to house a swelling axially receding relative to the lateral regions of the spokes of the disc, the swelling extending radially from the centering aperture, including a yoke of the radially inner fixing and centering part, along the central part of the spokes and as far as the outer circular mounting part and in which the yoke is offset axially outwardly relative to the bearing region.

The particular geometry of the radially inner part for fixing and centering the disc has the advantage of reducing the stress peaks withstood by this region during operation.

According to an advantageous embodiment, and taking into account a median axial plane between two adjacent fixing apertures, the axial distance (e) separating the internal face of the yokes and the internal face of the bearing region is at all points greater than the initial thickness of the sheet metal forming the wheel disc.

According to a preferred embodiment, the spokes have free lateral cut-out edges turned down towards the inner face of the disc. In the same way, advantageously the radially inner free edges of the circular assembly part are turned towards the inner face of the disc.

According to another preferred feature of the invention, the edges of the perforations are obtained by cutting out sheet metal, then turning down towards the inner face of the disc. This has the advantage of releasing a maximum perforated area so that no cut-out face is visible from the outside.

On the other hand, the appearance thus obtained is pleasant and the heavy perforation, apart from aerating the brakes well, brings a large degree of freedom of added styling (decorative wheel cover).

Preferably, the widths and depths of the swellings as well as the widths, sections and bending resistance of the spokes in the circumferential direction may decrease continuously from the radially inner part towards the radially outer circular part.

SUMMARY OF THE INVENTION

The object of these arrangements is to distribute the material in the optimum manner in the spoke, where it is necessary in order to reduce the operating strains according to the stresses to which the spoke is subjected.

Each bearing region around each fixing aperture may have at least two distinct bearing faces. Preferably these two bearing faces are disposed radially outward and inward relative to the axis of a fixing aperture. Each of these two bearing faces may also be divided circumferentially into two on either side of the axis of the fixing aperture.

Advantageously, the bottom of the swellings may comprise cut-out apertures. Such an aperture may be a standard perforation or serve to fix a styling part such as a decorative wheel cover.

The final shape of the spokes and of the perforations of the discs according to the invention may be obtained simultaneously in one or more embossing operations. Preferably, after being cut out, the edges of the perforations are trimmed from an embossed part before being turned down.

Finally, the number of spokes may be in particular 3, 4, 5 or 6.

The invention thus describes a wheel disc whose weight and method of manufacture are similar to those of a conventional steel disc optimised for a style approaching that of moulded or forged alloy discs.

The invention also has as a subject a wheel formed by the assembly of a rim and a disc according to the invention.

DESCRIPTION OF THE DRAWINGS

Wheel discs according to the invention will now be described by means of the attached drawing in which.

DESCRIPTION OF PREFERRED EMBODIMENTS OF THE INVENTION

Figure 1:
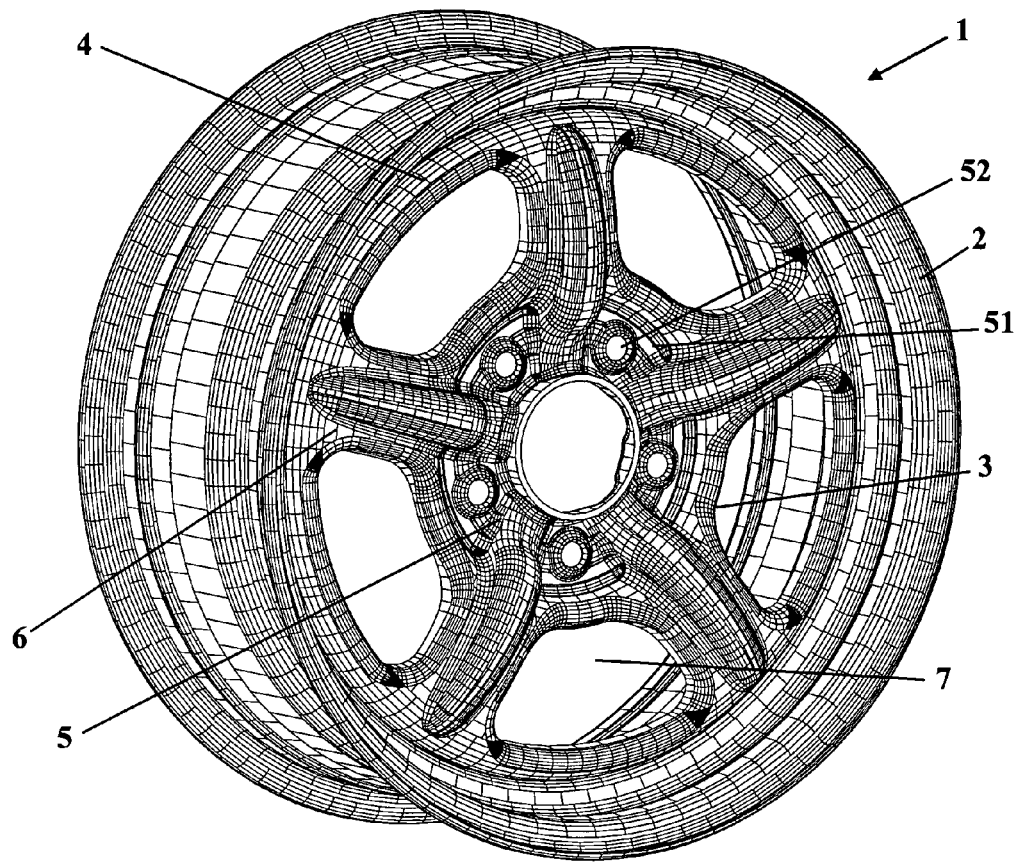
FIG. 1 is a perspective view of an assembled wheel having a disc according to the invention.
Figure 2:
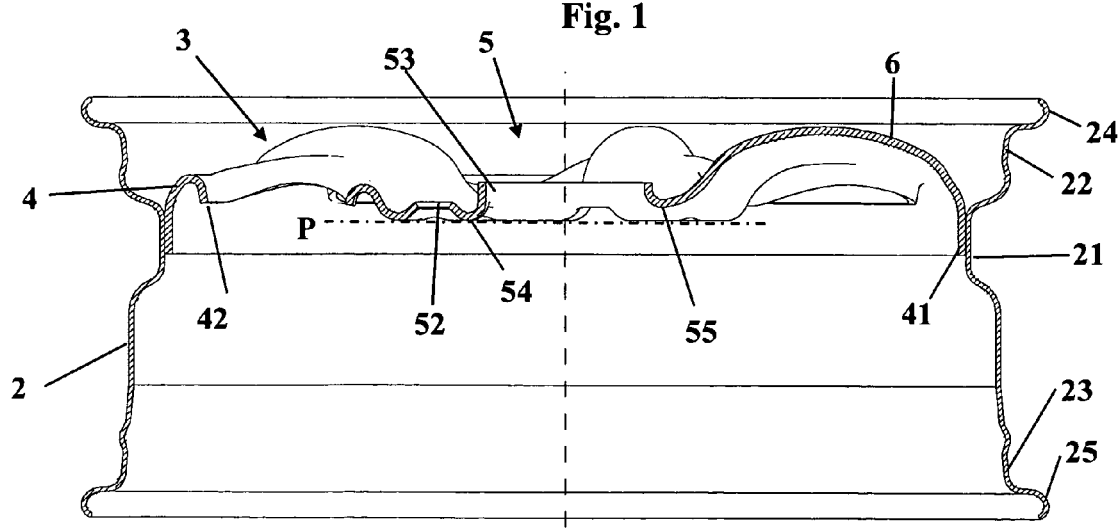
FIG. 2 is a view in axial section of the wheel of FIG. 1 along the axis of a fixing aperture.

FIG. 1 shows a perspective view of the outer side (or external face) of an assembled wheel 1 having a disc 3 according to the invention and a rim 2. FIG. 2 is an axial section of the same wheel through the axis of a fixing aperture. The rim 2 usually comprises two outer 24 and inner 25 flanges, two outer 22 and inner 23 seats, and a mounting groove 21.

The disc 3 is manufactured by molding, in particular embossing, from a sheet metal blank composed preferably of high-strength steel or aluminium hoop. The essential components of the disc 3 are a radially outer circular mounting part 4, a radially inner centering and fixing part 5, and linking spokes or radial arms 6 between the parts 4 and 5.

The part 4 is a mounting region with the rim 2, as FIG. 2 shows, and the radially outer edge 41 of this mounting part 4 has a direction substantially parallel to the axis of rotation of the disc 3. This mounting part 4 is circular, i.e. circumferentially continuous. Mounting on the rim 2 is usually effected by soldering. This may take place at the mounting groove 21 of the rim 2. It is also possible to effect mounting under the outer seat 22 of the rim 2.

Figure 4:
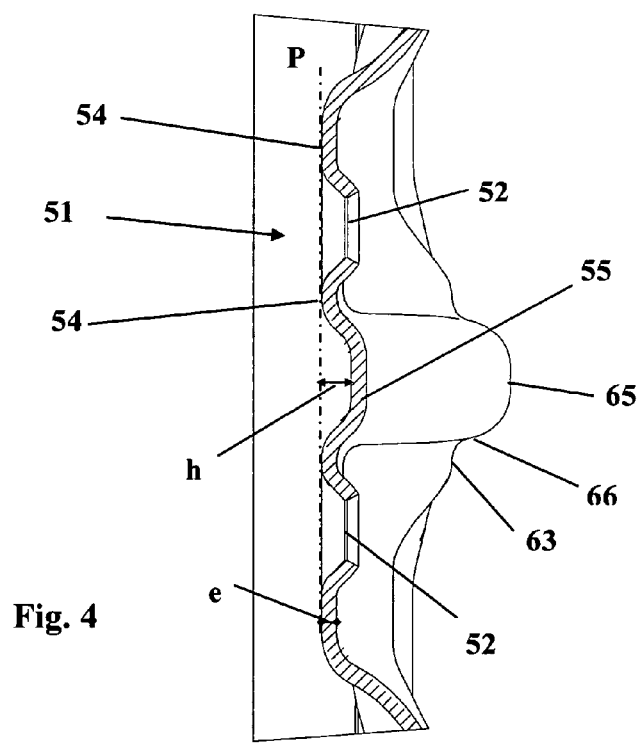
FIG. 4 is a view in section of the disc through the axes of two adjacent fixing apertures.

The fixing and centering part 5 in this case has a bearing region 51 with five fixing apertures 52 and a radially inner edge curved axially outward in the form of a collar or centering aperture 53. The fixing apertures 52 are conceived to receive fixing bolts of the disc to a wheel hub of the vehicle. The internal face of the bearing region 51 has a bearing face 54 intended to come into contact with the hub of the vehicle. This bearing face 54 corresponds to the plane P. As FIG. 4 shows, with a section of the disc 3 between two adjacent fixing apertures 52, the bearing region 51 as well as the bearing face 54 is interrupted between two fixing apertures by a yoke 55. Preferably, the axial distance h between the plane P of the bearing face 54 and the inner face of the yoke 55, in its central region, is greater than the thickness e of the starting sheet metal blank. This thickness e is between 3 and 6 mm according to the load that the wheel in question is to bear Each. yoke is defined by a bent portion of the piece of sheet metal and forms a generally concave side facing axially outwardly and a generally convex side facing axially inwardly. An axially inner surface of the yoke is offset axially outwardly from the plane P.

The particular geometry of this yoke makes it possible to distribute in an optimum manner the forces coming from the spokes towards the various bearing faces located on either side of the spoke in the bearing region, avoiding stress concentrations circumferentially opposite to the spoke.

The spokes 6 connect the parts 4 and 5 and ensure the transmission of forces between these two parts of the disc 3. The lateral edges of these spokes 6 together with the radially inner edge 42 of the mounting part 4 define large perforations 7.

Figure 3:
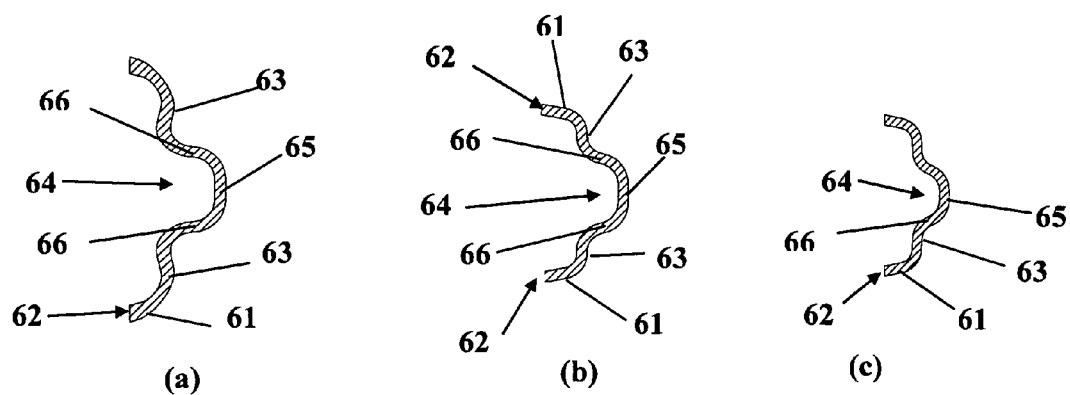
FIGS. 3(a) to 3(c) show the development of the cross-section of an spoke from the centre of the disc towards the exterior.

The problem of realising a wheel disc 3 having large perforations 7 is to make the spokes 6 which laterally define these perforations sufficiently resistant to the fatigue stresses which arise during operation. FIGS. 3(a) to 3(c) show the development of the section of an spoke 6 of the joining region with the fixing and centering part 5 towards the mounting part 4. The cross-section of these spokes 6 has two lateral regions 63 with two lateral edges 61 and a swelling 64 disposed at the centre center of the spoke, axially outwardly with a base 65 and two adjacent sides 66. In the embodiment in FIG. 1, each swelling 64 extends radially from the centering aperture 53, including a yoke 55, along the central part of the spokes 6 and as far as the outer circular mounting part 4. The free cut-out edges 62 of the two lateral edges 61 of the spokes 6 are folded down towards the interior of the disc. The axial height of the reinforcement side 66 of the swelling 64 relative to the two lateral regions 63 as well as the width of the base 65 of the swelling 64 decrease progressively as the radial distance from the axis of the disc increases. This is shown in Figs. (a), (b) and (c), and results in the bending resistance of each arm 6 decreasing from the inner part 5 to the outer part 4.

In the example described, the assembly of the free cut-out edges 62 of the spokes 6 and of the mounting part 42 all around the perforations 7 are folded towards the internal face of the disc 3. This makes it possible, in addition to lending additional rigidity, to increase the area of the perforations 7 and to give a more pleasing stylistic effect due to the disappearance of the areas where there are cut-outs, whose sharp ridges are not very attractive.

The fixing and centering region 5 is composed in the disc according to the invention of bearing regions 51 each surrounding a fixing aperture 52, the adjacent bearing regions 51 being separated by yokes 55, as well as a centering aperture 53.

Figure 5:
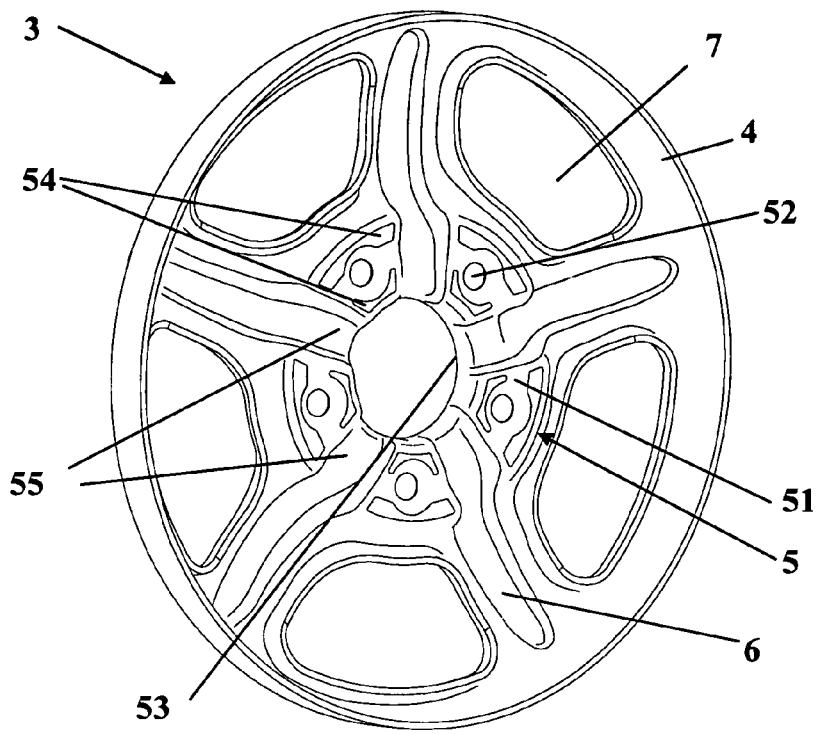
FIG. 5 is a perspective view of the internal face of the disc.

FIG. 5 shows a perspective view of the internal face of an embodiment of the disc 3 according to the invention. It shows in particular the fixing and centering part 5 having the five bearing regions 51 disposed around the five fixing apertures 52, the five yokes 55, and the centering aperture 53.

Figure 6:
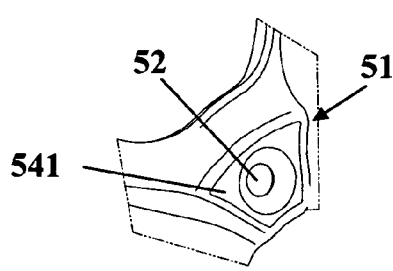
FIGS. 6, 7, 8 and 9 are enlargements of one of the fixing apertures of FIG. 5 and show four modified embodiments of the bearing faces.
Figure 7:
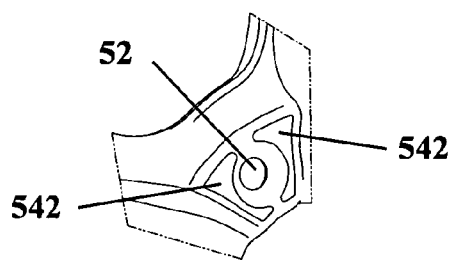
Figure 8:
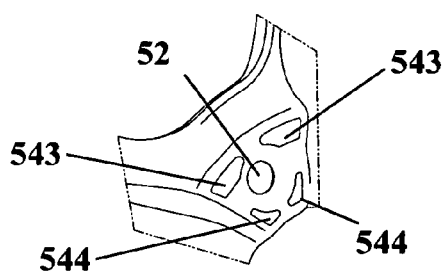
Figure 9:
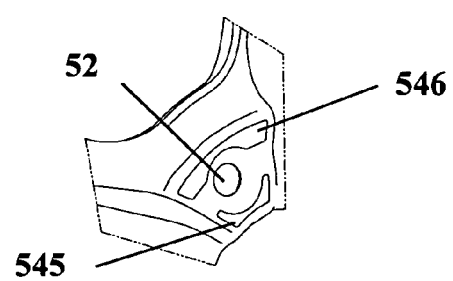

FIGS. 6 to 9 show four particular embodiments of the bearing faces 54 of the bearing regions 51. FIG. 6 shows a first embodiment in which the bearing face 541 is unique and surrounds the fixing aperture 52. In FIG. 7, the bearing face is composed of two faces 542 disposed circumferentially on either side of the fixing aperture 52. In FIG. 8, the bearing face is composed of four faces 543 and 544, two faces 543 disposed circumferentially on either side of and radially outward relative to the axis of the fixing aperture 52 and two faces 544 disposed circumferentially on either side of and radially inward relative to the axis of the fixing aperture 52. The bearing face of FIG. 9 itself has two bearing faces, one face 545 disposed radially inward relative to the axis of the fixing aperture 52 and one face 546 disposed radially outward relative to the axis of the fixing aperture 52. The geometry of the bearing faces makes it possible to distribute the region of stress concentration over the bearing region, and in the particular case of the disc 3 shown here, the embodiments shown in FIGS. 7, 8 and 9 have advantages over a single bearing face (FIG. 6). But the embodiments in FIGS. 8 and 9 are preferred. In fact, these two configurations do ensure that the bending forces transmitted by the spokes will be withstood by the bearing regions precisely arranged radially on either side of the axis of the fixing aperture 52.

The yoke 55, whilst preventing a stress concentration at right angles with the swelling 64, makes it possible to distribute in an optimum manner the forces transmitted by the bending of spoke 6 between the various bearing regions 541, 542, 543, 544, 545 and 546 of two fixing apertures 52 located on either side of the yoke 55.

Figure 10:
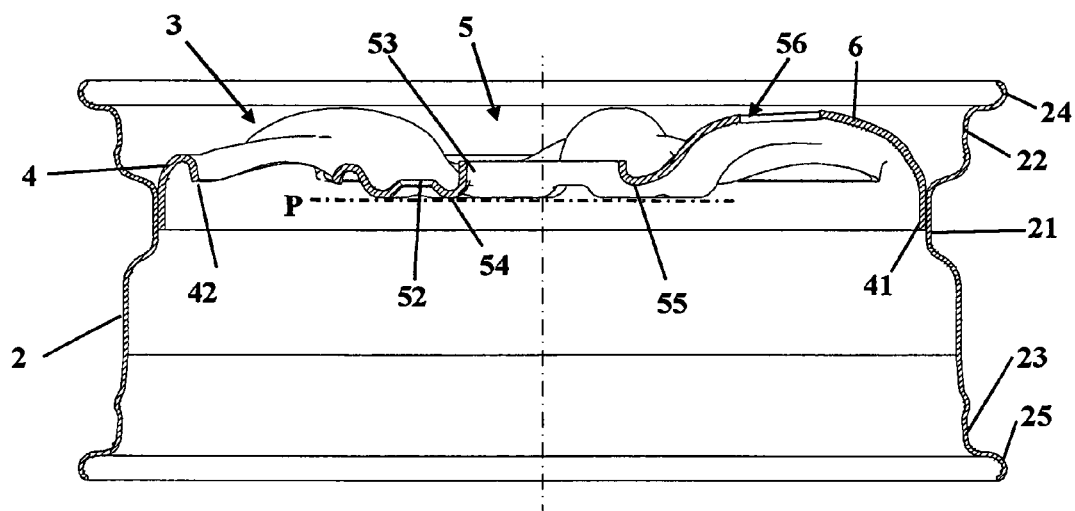
FIG. 10 is similar to FIG. 2 showing another embodiment of the invention.

FIG. 10 depicts another embodiment of the invention wherein a base of each swiveling 64 includes a cut-out aperture 56.

What is claimed is:

1. Wheel disc formed from a single piece of embossed sheet metal and comprising:
   a radially outer circular mounting part adapted to be connected to a rim;
   a radially inner part spaced radially inwardly from the outer part for fixing and centering to a wheel hub, the inner part including:
      a bearing region facing axially inwardly and defining a plane,
      a radially inner edge bent axially outwardly for forming a centering aperture defining a center axis of the wheel disc, the axis extending perpendicularly to the plane of the bearing region,
      a plurality of fixing apertures disposed radially outwardly of the axis and spaced circumferentially around the axis, and
      a plurality of yokes alternating circumferentially with the fixing apertures, each yoke defined by a bent portion of the piece of sheet metal forming a generally concave side facing axially outwardly, and a generally convex side facing axially inwardly, an axially inner surface of the generally convex side of the yoke being offset axially outwardly from the plane of the bearing region; and
   generally radially extending spokes interconnecting the inner part with a radially inner edge of the outer part, the spokes being circumferentially spaced apart to define perforations between adjacent spokes, each spoke being generally radially aligned with a respective yoke, and extending generally radially outwardly from adjacent a radially outer end of such yoke to a location at least as far as the radially inner edge of the outer part, each spoke including lateral portions spaced circumferentially apart by an axially outwardly swelling, wherein an axial dimension of the swelling recedes from its radial inner end to its radial outer end.

2. Disc according to claim 1, wherein, taking into account a median axial plane between two adjacent fixing apertures, the axial distance h separating the internal face of the yokes and the internal face of the bearing region is at all points greater than the initial thickness of the sheet metal forming the wheel disc.

3. Disc according to claim 1, wherein the spokes have free lateral cut-out edges folded axially inwardly.

4. Disc according to claim 1, wherein the perforations are obtained by cutting out the sheet metal and then folding the edges of the perforations axially inwardly.

5. Disc according to claim 4, wherein the section of the spokes decreases continuously from the radially inner part towards the circular radially outer part.

6. Disc according to claim 1, wherein the bending resistance of the spokes decreases from the inner part towards the outer part.

7. Disc according to claim 6, wherein the bearing region has around each fixing aperture at least two distinct bearing faces.

8. Disc according to claim 7, wherein the two distinct bearing faces are disposed radially on either side of the axis of the fixing aperture.

9. Disc according to claim 7, wherein at least one of the two bearing faces is formed of two bearing faced portions disposed circumferentially on either side of the fixing aperture.

10. Disc according to claim 9, wherein the base of the swellings has cut-out apertures.

11. Disc according to claim 1, wherein the final shape of the spokes and of the perforations is obtained simultaneously in one or more embossing operations.

12. Disc according to claim 1, wherein, after being cut out, the edges of the perforations are trimmed on an embossed part before being folded back.

13. Disc according to claim 1, wherein the number of spokes is one of: three, four, five or six.

14. Wheel, in particular for a passenger car, formed by assembling a rim and a disc according to claim 1.

* * * * *